Nov. 21, 1944.                 G. F. D'ALELIO                    2,363,297
      SYNTHETIC COMPOSITIONS PRODUCED BY ACETALIZING AND/OR
         KETALIZING HYDROLYZED COPOLYMERS OF VINYL ORGANIC
             ESTERS AND POLYVINYL ARYL COMPOUNDS
                     Filed Aug. 25, 1942

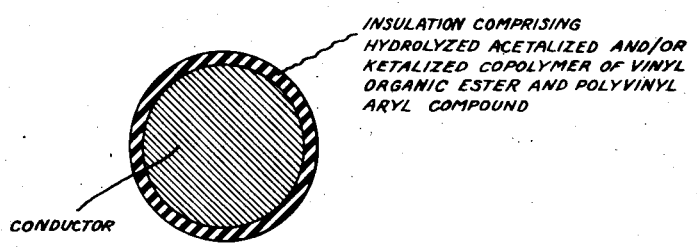

INSULATION COMPRISING
HYDROLYZED ACETALIZED AND/OR
KETALIZED COPOLYMER OF VINYL
ORGANIC ESTER AND POLYVINYL
ARYL COMPOUND

CONDUCTOR

Inventor:
Gaetano F. D'Alelio,
by Harry E. Dunham
His Attorney.

Patented Nov. 21, 1944

2,363,297

UNITED STATES PATENT OFFICE 2,363,297

SYNTHETIC COMPOSITIONS PRODUCED BY ACETALIZING AND/OR KETALIZING HYDROLYZED COPOLYMERS OF VINYL ORGANIC ESTERS AND POLYVINYL ARYL COMPOUNDS

Gaetano F. D'Alelio, Pittsfield, Mass., assignor to General Electric Company, a corporation of New York Application August 25, 1942, Serial No. 456,059

20 Claims. (Cl. 260—66)

This invention relates to the production of new materials having valuable and characteristic properties that make them especially suitable for use in industry, for example in molding, laminating, coating and adhesive applications, and for other purposes. The invention is concerned more particularly with the production of compositions of matter comprising an acetalized, a ketalized or an acetalized and ketalized copolymer (or copolymers) of a plurality of copolymerizable materials, one of which is a vinyl organic ester having a single

grouping and another of which is a poly-vinyl aryl compound. The present invention provides new and useful compositions comprising the product of conjoint hydrolysis and acetalization, ketalization or acetalization and ketalization of a copolymer of a vinyl ester containing a single

grouping and a poly-vinyl aryl compound. In producing these new compositions, the mixed copolymerizable materials may be partially or completely copolymerized prior to conjoint hydrolysis and acetalization, ketalization or acetalization and ketalization.

It has been suggested heretofore that synthetic compositions may be prepared by partially hydrolyzing (saponifying) a mixed polymerization product of two different vinyl esters (or a vinyl ester and an ester of acrylic acid), each of said esters having only a single

grouping, and reacting the partially hydrolyzed product with an aldehyde or a ketone to introduce acetal or ketal groups into the product. In such acetalized or ketalized products only the acid portion of one of the esters is removed in part. As a result, such treated copolymers are potentially hydrolyzable. Hydrolysis of the acetalized or ketalized copolymer during service use of the material would be harmful in many cases, for example where the product is in contact with metals, as the acid liberated by the hydrolysis would pit and corrode the metal surfaces. This danger of acid formation is even greater if an acrylic ester constitutes a component of the copolymer reactant.

I have discovered that synthetic compositions which are different from, and in many respects superior to, organic artificial masses heretofore known can be produced by conjoint hydrolysis and acetalization, ketalization or acetalization and ketalization of a copolymer of a plurality of copolymerizable materials including at least one vinyl organic ester having a single

grouping (e. g., vinyl formate, vinyl acetate, etc.) and at least one poly-vinyl aryl compound (e. g., divinyl benzene, divinyl toluene, etc.).

When a vinyl ester is copolymerized with a poly-vinyl aryl compound, cross-linkage takes place. These copolymers are superior in many respects to polymerized vinyl esters alone. When cross-linked, they become infusible and substantially insoluble in all the ordinary solvents. For example, a copolymer of 1% divinyl benzene and 99% vinyl acetate is infusible and is insoluble in alcohol, benzene, acetone, acetic acid, etc. In marked contrast, polyvinyl acetate is thermoplastic (fusible) and is soluble in alcohol, acetone, acetic acid, etc. The impact and flexural strengths of the cross-linked copolymers of vinyl esters and poly-vinyl aryl compounds also are much higher than the linear polymers of vinyl esters and the linear polymers obtained by polymerizing mixtures of different vinyl esters, or mixtures of vinyl and acrylic esters. A disadvantage in the practical utilization of these cross-linked copolymers of vinyl esters and poly-vinyl aryl compounds in plastic applications has been that they could not be molded to the desired shape after copolymerizing to an insoluble, infusible state.

The present invention is based on my discovery that a cross-linked copolymer of a vinyl ester having a single

grouping and a poly-vinyl aryl compound, even though such copolymer is infusible and is substantially insoluble in all the ordinary solvents, can be acetalized, ketalized or acetalized and ketalized to give products of outstanding properties. I have found that the products thereby obtained carry with them the advantages of the cross-linked copolymer plus the important added advantage that they become sufficiently thermoplastic, unlike the starting copolymer reactant, so they can be molded under heat and pressure to a desired shape. That the copolymers after such treatment would have this property, which may be described as "semi-thermoplasticity," was quite surprising and unpredictable, since it is inconceivable that the hydrocarbon cross-linkage present in the starting copolymer could be destroyed during the process of acetalization, ketalization or acetalization and ketalization.

In carrying my invention into effect I hydrolyze a copolymer of a vinyl ester having a single

grouping and a material copolymerizable therewith comprising a poly-vinyl aryl compound. I then cause the hydrolyzed copolymer to react with a

-containing organic compound selected from the class consisting of aldehydes, ketones and mixtures of aldehydes and ketones until at least some of the hydroxyl groups have been replaced by the corresponding acetal, ketal or acetal and ketal groups. For example, I may hydrolyze the copolymer to at least 10 per cent, more particularly from 25 to 100 per cent, of that theoretically possible and acetalize, ketalize or acetalize and ketalize the hydrolyzed copolymer until at least 10 per cent of the hydroxyl groups of the hydrolyzed copolymer have been replaced by the corresponding acetal, ketal or acetal and ketal groups. In some cases, for instance where resistance to water is of secondary consideration, the hydrolyzed copolymer may have only a minor proportion (that is, less than 50 per cent) of its hydroxyl groups replaced by acetal, ketal or acetal and ketal groups. For most applications, however, it is usually desirable that at least 50 per cent, say 60 to 100 per cent, of the hydroxyl groups of the hydrolyzed copolymer be replaced by acetal, ketal or acetal and ketal groups. Particularly valuable products are obtained when the copolymer is hydrolyzed to from 50 to 100 per cent of that theoretically possible and the hydrolyzed copolymer is acetalized, ketalized or acetalized and ketalized until from 75 to 100 per cent of the hydroxyl groups of the hydrolyzed copolymer are replaced by acetal, ketal or acetal and ketal groups.

In order that those skilled in the art better may understand how to practice this invention, the following more detailed description is given:

Preparation of copolymer

In effecting copolymerization between the vinyl ester and the poly-vinyl aryl compound the components are mixed and interpolymerized in the presence or absence of a solvent or a dispersion medium for the monomers by the use of heat, light, or heat and light in the presence or absence of a polymerization catalyst, at atmospheric, subatmospheric or superatmospheric pressure.

Suitable catalysts are the peroxides, e. g., benzoyl peroxide, sodium peroxide, hydrogen peroxide, acetyl benzoyl peroxide, etc.; the per-compounds, e. g., ammonium persulfate, sodium persulfate, sodium perchlorate, sodium perborate, potassium persulfate, etc.; ozone; ozonides; etc. Additional examples of polymerization catalysts which may be used are found in my U. S. Patent 2,260,005, issued October 21, 1941, and assigned to the same assignee as the present invention.

Instead of starting with monomeric materials, I may start with partially polymerized materials or with mixtures of monomeric and partially polymerized materials. Partially polymerized divinyl aryl compounds may be made by polymerizing in the presence of both an accelerator and inhibitor of polymerization. Such a method is more fully described and specifically claimed in my copending applications Serial Nos. 448,155; 448,156; 448,157; 448,158, all of which were filed June 23, 1942, and assigned to the same assignee as the present invention.

The rate of copolymerization and the properties of the copolymer reactant vary with the time, temperature, concentration and, if a catalyst is used, also with the catalyst concentration, and with the particular monomers or partial polymers employed in preparing the copolymer and the proportions thereof. Copolymerization may be effected at from room temperature (20° to 30° C.) to temperatures above 100° C., for example about 130° C., but ordinarily I use temperatures within the range of 60° to 120° C. in causing the mixed components to interpolymerize to a cross-linked copolymer.

Mainly for economic reasons I prefer to use not more than 50 per cent by weight (of the mixture) of the poly-vinyl aryl compound in forming the copolymer reactant, and generally use less than 30 per cent, for example from 0.1 to 10 per cent. The particular proportions employed are dependent to a large extent upon the particular starting components and the particular properties desired in the finished product.

In certain cases, instead of copolymerizing a single vinyl ester with one or more poly-vinyl aryl compounds, I may copolymerize a plurality of such esters with a single poly-vinyl aryl compound or with a plurality of poly-vinyl aryl compounds. Also, in some cases, other organic materials which are copolymerizable with the vinyl ester (or esters) and the poly-vinyl aryl compound (or compounds) may be incorporated into the mixture and the whole copolymerized (inter-polymerized) to form a cross-linked copolymer reactant of improved utility in the production of an acetalized, ketalized or acetalized and ketalized copolymer of particular properties. Examples of such organic materials which may be used with the vinyl ester and the poly-vinyl aryl compound in forming the cross-linked copolymer are maleate esters, itaconic esters, fumarate esters, vinyl ketones, vinyl ethers, allyl ethers, methallyl ethers, acrylic esters and nitriles, methacrylic esters and nitriles, etc.

Illustrative vinyl esters containing a single

grouping which may be used in preparing the starting copolymer reactant, are the vinyl esters of saturated aliphatic and aromatic monocarboxylic acids, more specifically the vinyl esters of the following acids: acetic, chloroacetic, propionic, bromopropionic, butyric, isobutyric, valeric, caproic, heptylic, caprylic, nonylic, capric, palmitic, benzoic, toluic, phenyl acetic, chlorobenzoic, cyclohexanoic, cyclopentanoic, etc. I may also use mono-vinyl esters of partially esterified polycarboxylic acids, for example the mono-vinyl esters of mono-ethyl phthalate, mono-methyl succinate, di-ethyl citrate, etc.

Illustrative examples of poly-vinyl aryl compounds which may be used are divinyl benzenes, divinyl toluenes, divinyl xylenes, divinyl ethyl benzenes, divinyl naphthalenes, divinyl chlorobenzenes, divinyl-phenyl vinyl ether, etc.

Treatment of copolymer

The cross-linked copolymers may be partially or completely hydrolyzed and thereafter acetalized, ketalized or acetalized and ketalized; or, the partial or complete acetalization, ketalization or acetalization and ketalization of the copolymer may be caused to take place simultaneously with the partial or complete hydrolysis of the copolymer.

When the copolymer is hydrolyzed separately from the reaction with the

-containing organic compound, this may be done, for example, by heating the copolymer with water and a suitable catalyst, examples of which are strong alkalies (e. g., sodium and potassium hydroxides, tetra-alkyl ammonium hydroxides, etc.) and strongly acidic bodies (e. g., mineral acids such as hydrochloric, sulfuric, etc., and acidic salts such as aluminum chloride, zinc chloride, etc.) until the desired degree of hydrolysis has been effected. I prefer to use an acid catalyst. The hydrolyzed product, with or without first being purified (or partially re-esterified if the hydrolysis has been carried farther than desired), then is acetalized, ketalized or acetalized and ketalized by causing it to react under acid conditions with an aldehyde, a ketone, a mixture of different aldehydes, a mixture of different ketones, or a mixture of a single aldehyde and a single ketone or of a plurality of different aldehydes and different ketones. The reaction is continued until the desired percentage of hydroxyl groups in the hydrolyzed copolymer have been replaced by acetal, ketal or acetal and ketal groups. The solid reaction product is isolated from the reaction mass, washed and dried.

Preferably I conduct the acetalization, ketalization or acetalization and ketalization reaction, under acid conditions, simultaneously with the hydrolysis of the copolymer. This may be done, for example, by treating the copolymer with water, an acidic catalyst (examples of which were given in the preceding paragraph) and an organic compound containing or engendering an active carbonyl

grouping, e. g., aldehydes, ketones, etc. Preferably the reaction is carried out in the presence of a liquid medium adapted to cause a molecular dispersion of the reaction product, e. g., in acetic acid, propionic acid, liquid (or liquifiable) monohydric alcohols, e. g., ethyl alcohol, butyl alcohol, amyl alcohol, etc., mixtures of liquid alcohols, acids and esters, etc. To shorten the time required to acetalize, ketalize or acetalize and ketalize the copolymer, it is desirable to maintain the reactants at an elevated temperature, say 60° to 100° C. or above, the exact temperature depending more or less upon the boiling point of the mixture. However, where a light colored product is desired, especially where a higher molecular weight

-containing organic compound is used, I prefer that the reaction be performed at room temperature. Ordinarily the reaction is carried out under reflux at the boiling point of the reaction mass.

After the conjoint hydrolysis and acetalization, ketalization or acetalization and ketalization reaction has been carried to the desired stage as determined by analysis or by previous experience, the reaction mass usually is mixed with water to which may be added, if desired, a neutralizing agent (e. g., sodium and potassium hydroxides and carbonates, ammonium hydroxides, etc.) for the acidic bodies. This causes coagulation of the treated copolymer, which thereafter is washed until free of water-soluble materials and then dried. The resulting products can be shaped by the application of heat, pressure or heat and pressure.

As agents for treating the copolymer I may use any aldehyde or ketone or any compound engendering an aldehyde or a ketone, that is, a compound which will be converted to an aldehyde or a ketone during the reaction. Examples of such compounds are formaldehyde, paraformaldehyde, paraldehyde, trioxymethylene, acetaldehyde, propionaldehyde, butyraldehyde, acrolein, methacrolein, croton aldehyde, benzaldehyde, cinnamic aldehyde, anisaldehyde, para-methoxy phenyl acetaldehyde, furfural, acetone, chloroacetone, methyl vinyl ketone, divinyl ketone, methyl ethyl ketone, acetophenone, benzophenone, quinone, tetrahydroquinone, benzil, benzoyl acetone, acetyl dibenzyl methane, benzal acetophenone, mesityl oxide, shogaol, cyclohexanone, vanillin, zingerone, alpha-oxy-tetrahydronaphthalene, paeonol, etc.

The properties, for example hardness, of the acetalized, ketalized or acetalized and ketalized copolymer are considerably influenced by the particular treating agent used. Thus, for the same cross-linked copolymer and the same degree of hydrolysis and acetalization, formaldehyde will yield a harder acetalized copolymer than propionaldehyde. On the other hand, acrolein and furfural yield more solvent resistant copolymers than formaldehyde. Mixtures of different aldehydes or of different ketones or of aldehydes and ketones may be used in certain cases to impart particular properties to the reaction product. In such modifications, the mixed treating agents may be caused to react together upon the hydrolyzed copolymer, the hydrolysis being carried out first and reaction with the

-containing compound afterwards, or hydrolysis and condensation with the mixed treating agents may be carried out simultaneously. Or, the hydrolyzed copolymer may be reacted first with one

-containing compound and then with another. Or, simultaneous hydrolysis and partial reaction with one

-containing compound may be caused to take place, followed by more complete reaction with a different

-containing compound.

The properties of the final product depend upon many factors, one of which is the composition of the starting copolymer reactant. For example, a cross-linked copolymer of 0.1 per cent divinyl benzene and 99.9 per cent vinyl acetate yields a final product of lower softening point than does a cross-linked copolymer of 10 per cent divinyl benzene and 90 per cent vinyl acetate, all other reactants and conditions being the same. The concentration of the polymerization catalyst and the temperature of polymerization used in the production of the copolymer reactant also influence the properties of the final product. High catalyst concentration and (or) high polymerization temperature yield copolymers of lower molecular weight than result from lower amounts of catalyst and (or) lower polymerization temperatures. These differences are reflected in the reaction products of the copolymer with a

-containing organic compound.

By varying the time and temperature of reaction and the concentration of the catalytic agent and of the

-containing organic compound it is possible to vary the extent of hydrolysis and the acetalization, ketalization or acetalization and ketalization of the copolymer. If the hydrolysis is carried out in the absence of a

-containing organic compound, the extent of hydrolysis also may be controlled by carrying hydrolysis farther than is ultimately desired and then re-esterifying the excess hydroxyl groups. In re-esterifying, a different acid than that produced in the hydrolysis may be used thereby further to alter the properties of the final acetalized product.

The properties of the final product may be varied also by varying the extent of hydrolysis, the extent of reaction with the

-containing organic compound and the ratio of hydroxyl groups to substituent groups and the ratio of each to the number of ester groups remaining in the molecule. For example, two products with entirely different properties will result from the same cross-linked copolymer reactant if, in one case, the hydrolysis is carried to 90 per cent of that theoretically possible and then 45 per cent of the available hydroxyl groups are acetalized, ketalized or acetalized and ketalized, while in the other case the hydrolysis is carried to 45 per cent of that theoretically possible and then 90 per cent of the available hydroxyl groups are acetalized.

The properties of these new artificial masses may be varied in still other ways. For example, their properties may be varied by carrying out the reaction with the

-containing compound in the presence of other reactants such, for instance, as organic compounds capable of forming methylol derivatives as an intermediate during the resin formation or other compounds capable of reacting with the

-containing compound or with the reaction product of the

-containing compound and the hydrolyzed copolymer. Examples of such modifying reactants which may be used as such, or in the form of their methylol or methylene derivatives, are phenols, including halogenated (e. g., chlorinated, brominated, etc.) and non-halogenated monohydric and polyhydric phenols, e. g., phenol itself and its homologues such as ortho, meta and para cresols, the xylenols, the butyl, amyl and hexyl phenols, tertiary amyl phenol, cyclohexyl phenol, phenyl phenol, styryl phenol, indene phenol, coumar phenol, resorcinol, chlorophenol, chlorophenyl phenol, chlorostyryl phenol, etc.; hydroxy aromatic esters, e. g., hydroxy benzoates, hydroxy phenyl propionates, hydroxy phenyl acetates, hydroxy cinnamates, etc.; hydroxy aromatic ethers, e. g., hydroquinone mono-ethers, guaiacols, etc.; monohydric and polyhydric alcohols, e. g., ethyl, propyl, isopropyl, butyl, amyl, etc., alcohols, ethylene glycol, diethylene glycol, glycerine, pentaerythritol, trimethylol nitro methane, etc.; amides, both monoamides and polyamides, e. g., formamide, acetamide, stearamide, malonic diamide, succinic diamide, adipic diamide, phthalic diamide, citric triamide, itaconic diamide, sulfonamides such as toluene sulfonamide, benzamide, urea and its homologues and derivatives and substances of the nature of urea, e. g., thiourea, methyl urea, tertiary amyl urea, phenyl thiourea, guanidine, biguanide, guanyl urea, amino triazines, amino triazoles, pseudothiourea, melamine, etc.; amines, e. g., ethylene diamine, aniline, phenylene diamine, amino phenols, etc.

The following specific examples are given in order to illustrate more clearly how the present invention may be carried into effect. All parts are by weight.

*Example 1*

Forty-eight parts of a cross-linked copolymer made by interpolymerizing 99 parts of vinyl acetate and 1 part partially polymerized divinyl benzene were reacted at 80° to 85° C. for 30 hours with

| | Parts |
|---|---|
| Aqueous formaldehyde (approx. 37.1% HCHO) | 54 |
| Acetic acid | 312 |
| Water | 168 |
| Hydrochloric acid (approx. 38% HCl) | 10 |

At the end of the reaction the above mix was a clear, viscous syrup. The resin was precipitated from the mixture by dilution with water. The resin was filtered off, washed well with water and dilute ammonium hydroxide and dried. The dried resin was easily molded at 150° C. under a pressure of 3,000 pounds per square inch. The molded piece had a flexural strength of 16,400 pounds per square inch and an impact strength of 0.10 foot pounds when measured on a Dynstat testing machine.

*Example 2*

Forty-eight parts of a cross-linked copolymer made by interpolymerizing 95 parts of vinyl acetate and 5 parts partially polymerized divinyl benzene were reacted at 80° to 85° C. for 30 hours with

| | Parts |
|---|---|
| Aqueous formaldehyde (approx. 37.1% HCHO) | 55 |
| Acetic acid | 468 |
| Water | 168 |
| Hydrochloric acid (approx. 38% HCl) | 10 |

When the reactants were treated as described in Example 1 a well molded piece was obtained. The effect of the increase in the amount of the poly-vinyl aryl compound present in the copolymer reactant caused an increase in impact strength to 0.135 foot pounds.

The fundamental synthetic compositions of this invention may be varied widely by introducing various modifying bodies during or after reaction of the hydrolyzed copolymer with the

-containing compound. These modifying bodies may take the form of high molecular weight bodies, with or without resinous characteristics, for example, hydrolyzed wood products, lignin, proteins, protein-aldehyde condensation products, furfural condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, synthetic linear condensation products such as the superpolyamides, etc.

Other modifying bodies of a plasticizing or softening nature also may be suitably incorporated into the fundamental synthetic materials of this invention. Examples of such modifying agents are the phthalate esters, for instance dimethyl phthalate, diethyl phthalate, dibutyl phthalate, etc.; the phosphate esters, e. g., tricresyl phosphate, triphenyl phosphate, etc.; glycol di-esters, e. g., glycol di-hexoate, glycol acetate-hexoate, glycol acetate benzoate, glycol di-acetoacetate, etc.; esters of furfuryl and tetrahydrofurfuryl alcohols, e. g., furfuryl and tetrahydrofurfuryl maleates, itaconates, fumarates, salicylates, phthalates, etc.; the amide esters of alkanol amines e. g., esters corresponding to the structural formulas RCONHCR$_2$CR$_2$OCOR, RCON(CR$_2$CR$_2$OCOR)$_2$ and N(CR$_2$CR$_2$OCOR)$_3$, in which formulas R represents hydrogen, alkyl or aryl radicals; the semi-amides of polyesters, e. g., semi-amides of polyesters; imides, e. g., succinimide, phthalimide, etc.; and similar substances.

The products of this invention may be stabilized against discoloration and made more resistant to decomposition under heat, particularly in the presence of air, by incorporating into the reaction mass or into the intermediate or finished products various inhibiting or stabilizing agents. Examples of such agents which may be used are phenolic bodies, e. g., phenol, resorcinol, alpha- and beta- naphthol, cresols, xylenols, carvacrol, thymol, para-tertiary butyl phenol, para-tertiary amyl phenol, para-phenyl phenol, etc.; amines e. g., ethyl, propyl, butyl, and amyl amines and higher members of the homologous series, methyl amyl, ethyl hexyl, iso-propyl butyl amines, etc., alkanol amines, e. g., mono-, di- and tri-ethanol amines, etc., poly-amines, e. g., ethylene diamine, tri- and tetra-methylene diamines, etc., aromatic primary, secondary, and tertiary amines and substitution products of such amines, e. g., benzyl amine, ethyl naphthyl amine, diphenyl amine, diphenyl methyl amine, etc.; amides, e. g., acetamide, benzamide, toluene sulfonamide, succinic diamide, etc.; reaction products of phenols, of amines and of amides, e. g., phenol-aldehyde condensation products, amine-aldehyde condensation products, amide-aldehyde condensation products; and similar substances. The chosen stabilizer (inhibitor) depends largely upon the particular acetalized, ketalized or acetalized and ketalized interpolymer to be stabilized and the particular service application of the finished product. Any suitable amount of stabilizer may be used, but ordinarily only a relatively small proportion, for example from about 0.1 to 3.0 per cent by weight of the product is employed.

Dyes, pigments and opacifiers (e. g., barium sulfate, zinc oxide, zinc sulfide, titanium compounds such as the oxides, flaked aluminum, copper and the like) may be incorporated into the compositions to alter the visual appearance and the optical properties of the finished product. Mold lubricants such as the metallic soaps of the high molecular weight fatty acids, for example the stearates and palmitates of tin, zinc, etc., waxes such as carnauba, high melting point paraffin waxes, etc., may be added to facilitate molding of the compositions. Various fillers may be used to provide a wide variety of molding compositions. The particular filler depends upon the particular application for which the molded article is to be used. As fillers may be used, for instance, bleached or unbleached wood flour, alpha cellulose in flock form, sheets or cuttings of paper, cloth, canvas, etc., asbestos in powdered or long or shoft fiber length including defibrated asbestos, powdered or flaked mica, wood chips, short or long wood fibers, synthetic or natural continuous threaded fibers, glass fibers in continuous filament or fabric (woven or felted) form, etc. The filled or unfilled synthetic compositions may be densified by working in a Banbury mixer, or by rolling, pelleting or other means, followed by grinding and screening to the desired particle size. The molding compositions may be molded, extruded or injected at elevated temperatures, e. g., 125° to 225° C. and at suitable pressures, e. g., at about 1,000 to 20,000 pounds per square inch, usually between about 2,000 and 4,000 pounds per square inch in compression molding.

In addition to their use in molding compositions and in the production of molded articles, these new plastic compositions may be dissolved or dispersed in solvents or swelling agents, e. g., dioxane, furfural, furfuryl alcohol, phenol, cresols, phenol alcohols, oxygenated solvents such as ketones, liquid aliphatic acids and alcohols, or in mixtures of such materials, to form liquid coating and impregnating compositions. Such liquid compositions also may contain oils, e. g., linseed oil, China-wood oil, perilla oil, soya bean oil, etc., pigments, plasticizers, driers and other addition agents commonly used in the production of paints, varnishes, lacquers, enamels, etc. Coating compositions made from these new synthetic materials (particularly those which are highly acetalized, ketalized or acetalized and ketalized), when applied to a base member, e. g., metals, and air-dried or baked, are strong, tough, abrasion-resistant, have good adhesive properties and excellent resistance to heat, water and organic solvents.

As illustrative of how the synthetic compositions of this invention may be used in the field of electrical insulation, the following examples are cited:

A liquid coating composition comprising an acetalized, ketalized or acetalized and ketalized interpolymer of the kind above described and a suitable volatile solvent is applied to a metallic conductor such as plain or tinned copper wire, for example by passing the wire through a bath of the coating composition. Thereafter the coated wire is passed through a suitably heated oven to vaporize the solvent and to convert the coating to a hard, tough, flexible, abrasion-, moisture- and solvent-resistant state. In some cases it may be desirable to wrap the conductor with a fibrous material, e. g., asbestos in defibrated or other form or with glass fibers, cotton cloth, paper, etc., before treating it with the solution. A further procedure is to coat and at least partly impregnate the wrapped conductor with a syrupy solution of the treated interpolymer, wind the thus insulated conductor into the desired coil, and then heat the wound coil to evaporate the solvent and to harden the residual product.

Sheet insulation may be prepared by treating woven or felted organic or inorganic fabrics or paper with these new synthetic materials. Sheet insulation also may be prepared by binding together flaky inorganic substances with the new materials of this invention. For example, mica flakes may be cemented and bonded together with an acetalized, ketalized or acetalized and ketalized interpolymer to form laminated mica products.

In addition to their use as electrically insulating materials the products of this invention have a wide variety of other applications. For instance, they may be used in the production of so-called "safety glass," wherein superimposed layers of glass are firmly united with a binder comprising one or more of these new synthetic materials. Particularly suitable for such applications are organic plastic materials produced by reaction of butyraldehyde with a hydrolyzed copolymer of vinyl acetate and a poly-vinyl aryl compound. In such plastic materials the hydroxyl groups of the hydrolyzed copolymer are replaced by butyral groups.

The modified or unmodified products of this invention have a wide variety of other uses, for instance in making interior finishing and construction materials for homes, offices, etc., particularly where high-impact strength and shock-resistant structures are desired. They also may be molded or otherwise suitably shaped to produce buttons, clock cases, radio cabinets, household utensils, decorative novelties, etc. Some of the synthetic materials of this invention are fiber-forming, that is, they can be drawn into continuous filaments. Such filaments may be made into felted or woven fabrics. The highly acetalized, ketalized or acetalized and ketalized interpolymers are especially adapted for use as water repellents and sizings when applied to wood or the like, or to fibrous materials such as silk, cotton, wool, synthetic organic fibers, etc., in continuous filament, fabric or other form. The synthetic materials of this invention also may be used in making laminated fibrous sheet materials wherein superimposed layers of cloth, paper, etc., are firmly bonded together with the synthetic material; as impregnants for electrical coils and other electrical devices; in the construction of electric circuit interrupters; as insulation for motors, generators and other dynamo-electric machines, e. g., as insulation for the coil windings, as slot insulation, in the form of sleevings over electrical connections, as separators between running and starting coil windings, etc.

The figure in the drawing is a cross sectional view of an electrical conductor provided with insulation comprising synthetic compositions of the character described and claimed herein.

What I claim as new and desire to secure by Letters Patent of the United States is:

1. The process of preparing new synthetic compositions which comprises reacting a hydrolyzed copolymer of a plurality of copolymerizable materials, one of which is a vinyl ester of an organic carboxylic acid having a single

grouping and another of which is a divinyl aryl compound of the class consisting of divinyl aryl hydrocarbons, divinyl halogenated aryl hydrocarbons and divinyl aryl ethers, with a $$\diagdown C=O \diagup$$

-containing organic compound selected from the class consisting of aldehydes and ketones.

2. The process of preparing new synthetic compositions which comprises hydrolyzing an infusible, insoluble copolymer of a mixture comprising a vinyl ester of an organic carboxylic acid having a single

grouping and a divinyl aryl compound of the class consisting of divinyl aryl hydrocarbons, divinyl halogenated aryl hydrocarbons and divinyl aryl ethers and acetalizing the hydrolyzed copolymer until at least some of the hydroxyl groups of the hydrolyzed copolymer have been replaced by acetal groups.

3. The process of preparing new synthetic compositions which comprises partially hydrolyzing an infusible, insoluble copolymer of a mixture comprising a vinyl ester of an organic carboxylic acid having a single

grouping and a divinyl aryl compound of the class consisting of divinyl aryl hydrocarbons, divinyl halogenated aryl hydrocarbons and divinyl aryl ethers and acetalizing the partially hydrolyzed copolymer until at least 50 per cent of the hydroxyl groups of the hydrolyzed copolymer have been replaced by acetal groups.

4. The process of preparing new synthetic compositions which comprises partially hydrolyzing an infusible, insoluble copolymer of a mixture comprising a vinyl ester of an organic carboxylic acid having a single

grouping and a divinyl aryl compound of the class consisting of divinyl aryl hydrocarbons, divinyl halogenated aryl hydrocarbons and divinyl aryl ethers and ketalizing the partially hydrolyzed copolymer until at least 50 per cent of the hydroxyl groups of the hydrolyzed copolymer have been replaced by ketal groups.

5. The process of preparing new synthetic compositions which comprises forming an infusible, insoluble, cross-linked copolymer of a mixture comprising a vinyl ester of an organic carboxylic acid having a single

grouping and a divinyl aryl compound of the class consisting of divinyl aryl hydrocarbons, divinyl halogenated aryl hydrocarbons and divinyl aryl ethers, hydrolyzing the said copolymer to at least 10 per cent of that theoretically possible and acetalizing the hydrolyzed copolymer until at least 10 per cent of the hydroxyl groups of the hydrolyzed copolymer have been replaced by acetal groups.

6. The process of preparing new synthetic compositions which comprises hydrolyzing, to from 25 to 100 per cent of that theoretically possible, an infusible, insoluble, cross-linked copolymer of a mixture comprising a vinyl ester of an organic carboxylic acid having a single

grouping and a partially polymerized divinyl aryl compound of the class consisting of divinyl aryl hydrocarbons, divinyl halogenated aryl hydrocarbons and divinyl aryl ethers and simultaneously with the hydrolysis reaction acetalizing the hydrolyzed copolymer until at least 50 per cent of the hydroxyl groups of the hydrolyzed copolymer have been replaced by acetal groups.

7. A process as in claim 6 wherein the hydrolyzed, infusible, insoluble copolymer is acetalized until from 60 to 100 per cent of the hydroxyl groups of the hydrolyzed copolymer have been replaced by acetal groups.

8. A process as in claim 6 wherein the infusible, insoluble copolymer is hydrolyzed to from 50 to 100 per cent of that theoretically possible and the hydrolyzed copolymer is acetalized until from 75 to 100 per cent of the hydroxyl groups of the hydrolyzed copolymer have been replaced by acetal groups.

9. The process of preparing new synthetic compositions which comprises effecting reaction between ingredients comprising (1) a

-containing organic compound selected from the class consisting of aldehydes and ketones and (2) a hydrolyzed, infusible, insoluble, cross-linked copolymer of vinyl acetate and a partially polymerized divinyl aryl compound of the class consisting of divinyl aryl hydrocarbons, divinyl halogenated aryl hydrocarbons and divinyl aryl ethers, said reaction being carried out in a liquid medium and in the presence of an acidic catalyst until at least 50 per cent of the hydroxyl groups of the hydrolyzed copolymer have been replaced, and isolating the solid reaction product from the reaction mass.

10. A composition comprising a reaction product of ingredients comprising (1) the hydrolyzed, infusible, insoluble copolymer of a plurality of copolymerizable materials, one of which is a vinyl ester of an organic carboxylic acid having a single

grouping and another of which is a divinyl aryl compound of the class consisting of divinyl aryl hydrocarbons, divinyl halogenated aryl hydrocarbons and divinyl aryl ethers, and (2) a

-containing organic compound selected from the class consisting of aldehydes and ketones.

11. An organic plastic material obtained by reaction of an aldehyde with a hydrolyzed, infusible, insoluble product of polymerization of a mixture containing a vinyl ester of an organic carboxylic acid having a single

grouping and a divinyl aryl compound of the class consisting of divinyl aryl hydrocarbons, divinyl halogenated aryl hydrocarbons and divinyl aryl ethers.

12. A composition comprising the resinous reaction product of ingredients comprising (1) a

-containing organic compound selected from the class consisting of aldehydes and ketones and (2) a hydrolyzed, infusible, insoluble copolymer of vinyl acetate and a divinyl aryl compound of the class consisting of divinyl aryl hydrocarbons, divinyl halogenated aryl hydrocarbons and divinyl aryl ethers.

13. A composition comprising the acetal obtained by reaction of an aldehyde with a hydrolyzed, infusible, insoluble copolymer of vinyl acetate and a divinyl aryl compound of the class consisting of divinyl aryl hydrocarbons, divinyl halogenated aryl hydrocarbons and divinyl aryl ethers.

14. A synthetic plastic material obtained by reaction of formaldehyde with a hydrolyzed, infusible, insoluble copolymer of vinyl acetate and a divinyl aryl compound of the class consisting of divinyl aryl hydrocarbons, divinyl halogenated aryl hydrocarbons and divinyl aryl ethers.

15. A plastic composition obtained by reaction of butyraldehyde with a hydrolyzed, infusible, insoluble copolymer of vinyl acetate and a divinyl aryl compound of the class consisting of divinyl aryl hydrocarbons, divinyl halogenated aryl hydrocarbons and divinyl aryl ethers.

16. A composition comprising a hydrolyzed and acetalized infusible, insoluble copolymer of a vinyl ester of an organic carboxylic acid having a single

grouping and a partially polymerized divinyl aryl compound of the class consisting of divinyl aryl hydrocarbons, divinyl halogenated aryl hydrocarbons and divinyl aryl ethers.

17. The product obtained by simultaneously hydrolyzing and acetalizing an infusible, insoluble copolymer of vinyl acetate and divinyl benzene.

18. An artificial mass especially adapted for use in the plastics and coating arts, said mass comprising a plasticized, hydrolyzed, infusible, insoluble copolymer of vinyl acetate and divinyl benzene in which at least 50 per cent of the hydroxyl groups have been replaced by formal groups.

19. An organic plastic material comprising a hydrolyzed, infusible, insoluble copolymer of vinyl acetate and divinyl benzene in which at least 50 per cent of the hydroxyl groups have been replaced by butyral groups.

20. An insulated electrical conductor comprising a metallic conductor and insulation thereon comprising a reaction product of ingredients comprising (1) a hydrolyzed, infusible, insoluble copolymer of a plurality of copolymerizable materials, one of which is a vinyl ester of an organic carboxylic acid having a single $$CH_2=C{<}$$

grouping and another of which is a divinyl aryl compound of the class consisting of divinyl aryl hydrocarbons, divinyl halogenated aryl hydrocarbons and divinyl aryl ethers, and (2) a $$\mathord{>}C=O$$

-containing organic compound selected from the class consisting of aldehydes and ketones.

GAETANO F. D'ALELIO.